(12) United States Patent
Smead

(10) Patent No.: US 9,272,436 B2
(45) Date of Patent: Mar. 1, 2016

(54) AUTOMOTIVE EMBLEM ASSEMBLY AND METHOD

(71) Applicant: Steven Philip Smead, Ceresco, MI (US)

(72) Inventor: Steven Philip Smead, Ceresco, MI (US)

(73) Assignee: Adhesive Templates, Springfield, MI (US)

( * ) Notice: Subject to any disclaimer, the term of this patent is extended or adjusted under 35 U.S.C. 154(b) by 0 days.

(21) Appl. No.: 13/739,441

(22) Filed: Jan. 11, 2013

(65) Prior Publication Data

US 2013/0213555 A1    Aug. 22, 2013

Related U.S. Application Data

(60) Provisional application No. 61/585,629, filed on Jan. 11, 2012.

(51) Int. Cl.
*B26F 1/00* (2006.01)
*B32B 38/10* (2006.01)
*B26F 1/38* (2006.01)
*B60R 13/00* (2006.01)

(52) U.S. Cl.
CPC ............ *B26F 1/00* (2013.01); *B26F 1/3813* (2013.01); *B32B 38/10* (2013.01); *B60R 13/005* (2013.01); *B32B 2519/00* (2013.01); *Y10T 83/0481* (2015.04)

(58) Field of Classification Search
CPC .......... B26F 1/00; B32B 38/10; B60R 13/005
USPC ............... 156/94; 83/30; 707/802; 428/40.1
See application file for complete search history.

(56) References Cited

U.S. PATENT DOCUMENTS

| | | | |
|---|---|---|---|
| 6,709,541 B2* | 3/2004 | Slone | 156/230 |
| 2003/0203165 A1* | 10/2003 | Nobles et al. | 428/195.1 |
| 2007/0212509 A1* | 9/2007 | Herbig et al. | 428/40.1 |

OTHER PUBLICATIONS http://www.v8buick.com/showthread.php?242072-Installing-body-emblems-without-drilling, Forum #2, Steve Covington, posted Jan. 7, 2012 "Re: Installing body emblems without drilling".*
http://www.autogeek.net/3m-auto-tape.html; Apr. 25, 2009.*
http://products3.3m.com/catalog/us/en001/auto_marine_aero/pro_market/node_GSWPGWXTH0be/root_GST1T4S9TCgv/vroot_CX2WXLSHJ7ge/gvel_S2Z15RR9ZVgl/theme_us_attachmenttapes_3_0/command_AbcPageHandler/output_html, Oct. 23, 2006.*

* cited by examiner

*Primary Examiner* — Jeff Aftergut
*Assistant Examiner* — Jaeyun Lee
(74) *Attorney, Agent, or Firm* — The Watson I.P. Group, PLC; Jovan N. Jovanovic; Vladan M. Vasiljevic

(57) ABSTRACT

A method of reusing an existing emblem from a vehicle. The method includes the steps of providing the identification of the existing emblem. From there, the dimensional characteristics of the existing emblem can be determined. The determined dimensional characteristics are then turned into a plurality of perforations through an adhesive sheet so that they correspond to the dimensional characteristics of the existing emblem. The existing emblem can then be applied to the adhesive sheet, and in turn, can be attached to a vehicle by way of the adhesive sheet. An entire library of templates corresponding to the dimensional characteristics of a plurality of existing emblems can be created.

6 Claims, 2 Drawing Sheets

AUTOMOTIVE EMBLEM ASSEMBLY AND METHOD

CROSS-REFERENCE TO RELATED APPLICATION

This application claims priority from U.S. Prov. Pat. App. Ser. No. 61/585,629 filed Jan. 11, 2012, entitled "Automotive Emblem Assembly and Method," the entire disclosure of which is hereby incorporated by reference in its entirety.

BACKGROUND OF THE DISCLOSURE

1. Field of the Disclosure

The disclosure relates in general to automotive emblem assembly, and more particularly, to replacement automotive emblem assemblies that are utilized when body panels are damaged but wherein the original automotive emblems are virtually undamaged and can be reused.

2. Background Art

Vehicles have a number of emblems that are positioned on the body panels at various locations. This includes the name of the car marque, the model number, the engine size, trim levels, and other descriptors (i.e., fuel injection, turbo, compressor, automatic, among others).

Whereas decades ago, these emblems included studs that extended into openings in the body panels and were either coupled to the body panel on the inside surface of the body panel, or interference fit to the opening itself. At times, these emblems were made from metal or plastic. Thus, the emblems were easily reusable in that they could be reused as needed or as desired as long as they were not damaged.

Over the past two decades, there has been a move from such emblems as described above to emblems that include an inner adhesive material which bonds the emblems to a body panel. With such emblems, there are no openings in the body that are prone to rust. In addition, the adhesive forms a tight bond which is generally impervious to liquids and the like. Additionally, the emblems are overwhelmingly made from plastics (and in some instances, painted plastics, or metal plated plastics).

Problematically, these newer adhered emblems are typically not reused, but are discarded in the event that they are removed from the automobile. For example, if there is body work to be completed which is in proximity to adhered emblems, the emblems are removed with certain adhesive removal products that are commercially available. They are then replaced with new emblems when the repair is completed. In addition, when an entire body panel is removed and replaced, the emblems are merely left on the panel that is removed.

The reason that such emblems are not reused is that it is difficult to properly and expeditiously replace the adhesive that is placed on the surface of the emblem. It is the adhesive replacement which is so difficult to properly apply which renders the removed emblems useless, even when the emblem itself has no damage.

It is an object of the present invention to provide a manner in which automotive emblems that are coupled with adhesive to the body of a vehicle can be reapplied with an adhesive in an expeditious manner and, therefore be reusable.

This object as well as other objects of the present invention will become apparent in light of the present specification, claims, and drawings.

SUMMARY OF THE DISCLOSURE

The disclosure is directed to an emblem assembly comprising an existing emblem body and an adhesive sheet assembly. The existing emblem body has an outward surface and an adhesive attachment surface. The adhesive sheet assembly has a body, and an adhesive applied to either side of the body of the adhesive sheet. The adhesive sheet includes perforations through the body that corresponds to the existing emblem which, in turn, allows for the reuse of the existing emblem.

In another aspect of the disclosure, the disclosure is directed to a method of reusing an existing emblem from a vehicle. The method includes the step of providing an identification of an existing emblem. Once provided, the dimensional characteristics of the existing emblem can be determined. Next, an adhesive sheet can be provided. A plurality of perforations are formed through the adhesive sheet corresponding to the dimensional characteristics of the existing emblem. It will be understood that the emblem can be applied in the appropriate orientation relative to the perforations so that the when the adhesive sheet not corresponding to the existing emblem is removed, a portion of the adhesive sheet remains coupled to the existing emblem in the proper orientation for application thereof to a vehicle.

In a preferred embodiment, the method further includes the steps of storing the dimensional characteristics of the existing emblem. For example, the dimensional characteristics can be stored on a computer in any number of different configurations which are known to those of skill in the art, including, but not limited to files accessible by conventional CAD or design programs.

In another preferred embodiment, the adhesive sheet includes a body with an adhesive applied thereto. The body comprises a foam material. Generally, the adhesive is a pressure sensitive adhesive which provides a bond to both vehicle panels and to the existing emblem through various conditions and through adverse conditions.

In another preferred embodiment, the existing emblem further comprises a plurality of separate elements which are spaced apart in a predetermined orientation when positioned on a vehicle. In such an embodiment, the step of providing an adhesive sheet further comprises the step of maintaining the predetermined orientation of the separate elements while forming a plurality of perforations through the adhesive sheet. In turn, the position each of the separate elements is in the proper configuration on the adhesive sheet.

In another preferred embodiment, the step of forming a plurality of perforations occurs through an automated cutting plotter which is coupled to a computing device for providing the automated cutting plotter the dimensional characteristics of the existing emblem.

In another aspect of the present disclosure, the disclosure is directed to a method of creating a library of templates corresponding to existing emblems utilized on vehicles. The method comprises the steps of providing an identification of a plurality of existing emblems. Next, a number of the dimensional characteristics of each of the plurality of existing emblems is determined. Subsequently, a template is created corresponding to the dimensional characteristics of each of the plurality of existing emblems. Finally, each of the templates is stored.

In a preferred embodiment, the step of creating a template further comprises the step of creating a template using software on a computing device (i.e., computer).

In another preferred embodiment, the step of storing each of the plurality of templates further comprises the step of storing each of the plurality of templates on a computer.

In another aspect of the disclosure, the disclosure is directed to a method of reusing an existing emblem for a vehicle. The method comprises the steps of removing the existing emblem from the vehicle. The existing emblem is coupled to the vehicle through an adhesive, most typically. The residue left from the adhesive is cleaned from the existing emblem so that the new emblem can be applied. Next, a template is identified that corresponds to the dimensional characteristics of the existing emblem from a plurality of templates (such as, for example, an electronic library of templates). Once identified, an adhesive sheet is obtained, the sheet being formed based upon the template and the dimensional characteristics of the existing emblem. Once obtained, the existing emblem is applied to the adhesive sheet in the predetermined, desired orientation (i.e., so that it aligns in the proper manner with the different perforations). Finally, the existing emblem can be adhered to a vehicle in a predetermined orientation with the adhesive sheet.

In a preferred embodiment, the step of obtaining an adhesive further comprises the steps of providing the dimensional characteristics to an automated cutting plotter; and cutting the perforations with the automated cutting plotter.

In such a preferred embodiment, the cutting plotter is located remotely from the user. Therefore, the step of obtaining further comprises the step of communicating with the cutting plotter through the Internet. For example, the user may have web access to the library, and from there select the desired template. The template is then remotely formed either through direct, or indirect control (i.e., through ordering) by the user. The adhesive sheet with the perforations can then be mailed to the user.

In another preferred embodiment, the step of applying the existing emblem further comprises the step of removing portions of the adhesive sheet surrounding the existing emblem. The portions surrounding the existing emblem, in some embodiments, can be utilized for locating purposes, among other uses.

In yet another embodiment, the existing emblem further includes a plurality of separate elements which are spaced apart in a predetermined orientation. With such separate elements that are spatially related, the method further comprising the step of applying each of the plurality of separate elements to a single adhesive sheet, to, in turn, maintain the spaced apart predetermined orientation. The adhesive sheet between the separate elements maintains the proper relative relationship between the separate elements.

BRIEF DESCRIPTION OF THE DRAWINGS

The disclosure will now be described with reference to the drawings wherein.

DETAILED DESCRIPTION OF THE DISCLOSURE

Figure 1:
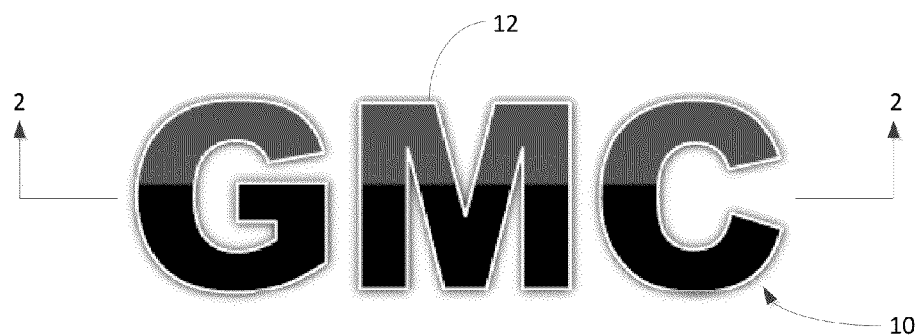
FIG. 1 of the drawings is a top plan view of an existing emblem of the present disclosure.
Figure 2:
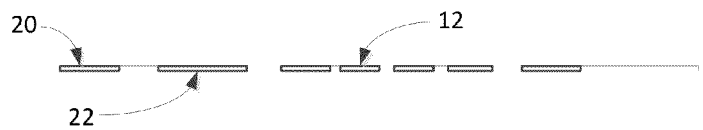
FIG. 2 of the drawings is a cross-sectional view of an existing emblem of the present disclosure taken generally about lines 2-2 of FIG. 1.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, emblem assembly 10 is shown in FIG. 1 as comprising emblem body 12, and adhesive sheet assembly 14. The emblem body 12 is typically an existing emblem that has been applied to a vehicle. Such emblems may comprise any number of different indicia. They may comprise symbols such as, for example, the Corvette emblem, or the Mercedes Star emblem, among others. Other emblems may comprise the marque name (i.e., Chevrolet, Mercedes, Toyota) which may be a single emblem or a separate emblem for a number of different letters. Still other emblems may include motor displacement (i.e., 5.7 liter, 3.1 liter, etc.) or a trim level, or feature of the vehicle (i.e., LX, 4WD, turbo, automatic, compressor, 5-speed, etc.). Still other emblems may comprise a combination of these features. The particular disclosure is not limited to any particular type of and/or configuration of emblem that is to be coupled to a vehicle.

Typically, the emblem body 12 includes an outward surface 20 and an adhesive attachment surface 22. The outward surface may comprise a three dimensional surface having varying topographies. For example, lettering may comprise block lettering that has a top surface and side surfaces, or may include a fully contoured three dimensional surface. The adhesive attachment surface 22 typically comprises a planar surface, although concave surfaces and convex surfaces are likewise contemplated for use. In certain instances the part number or other coding is identified on the adhesive attachment surface. Often times, the surface is slightly convex so that the edge of the surfaces is well defined. In other instances, the surface variations are such that the thickness and compliance of the adhesive tends to eliminate or minimize any surface variation in the materials.

Generally, the emblem body comprises a polymer, such as an ABS plastic or the like. In certain embodiments, a portion of or the entirety of the body may be painted or otherwise coated with a paint or coating. In other embodiments, a plating (such as chromium or iridium) may be applied to the polymer base. In some instances, the emblem may comprise a metal or alloy thereof. In many instances, the emblem materials are suitable to withstand the elements for an unlimited period of time.

Figure 3:
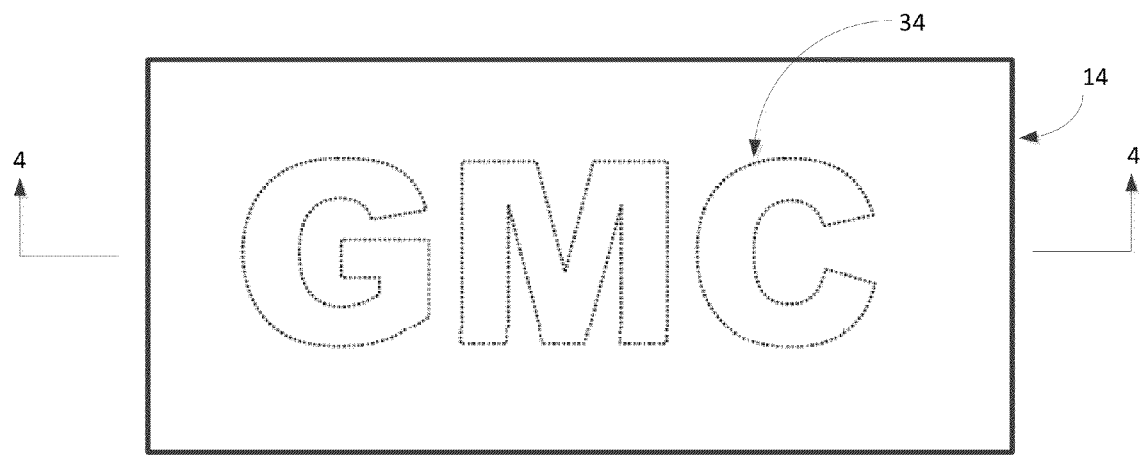
FIG. 3 of the drawings is a top plan view of an adhesive sheet assembly having perforations corresponding to the existing emblem shown in FIG. 1.
Figure 4:
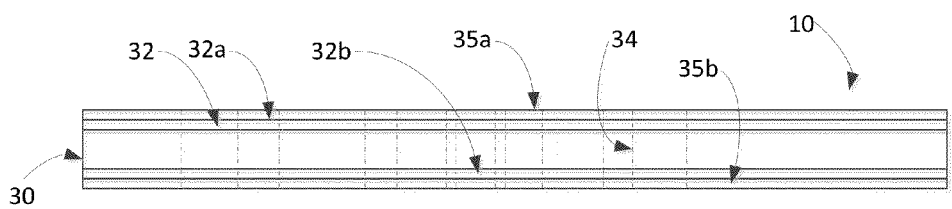
FIG. 4 of the drawings is a cross-sectional view of an adhesive sheet assembly of the present disclosure taken generally about lines 4-4 of FIG. 3.

The adhesive sheet assembly 14 is shown in FIGS. 3 and 4 as comprising a commercially available adhesive sheet that generally includes body 30, adhesive 32 and perforations 34. The body 30 comprises a foam polymer material having a certain thickness. The thickness of the foam polymer is such that it provides some cushioning properties as well as properties that can accommodate imperfections on the body of the automobile as well as the adhesive attachment surface 22. An adhesive 32 includes adhesive surfaces 32a and 32b which are applied to either side of the body 30. It is known that these adhesives are configured to retain the emblem in position for many years, through various weather conditions, without failing.

The adhesive sheet assembly 14 may further include coverings 35a, 35b over the adhesive surfaces 32a, 32b which can be removed to expose the adhesive surface when needed. The adhesive sheet assembly can be provided with perforations 34 that precisely mimic the configuration of any emblem that is desired. As such, the covering (release surface) can be removed and the emblem can be applied to the adhesive sheet assembly following the perforations. The perforations are precisely cut to match the emblem. In addition, where there are a number of emblems that have a particular spacing, the same spacing can be mimicked on the adhesive sheet assembly with the perforations 34.

As will be explained herein below, the emblem can be provided and coupled to the adhesive sheet assembly and the portion of the adhesive sheet assembly that is coupled to the emblem is separated by way of the perforations from the remainder of the adhesive sheet. The emblem is then ready for use again and ready for attachment to a body panel.

Figure 5:
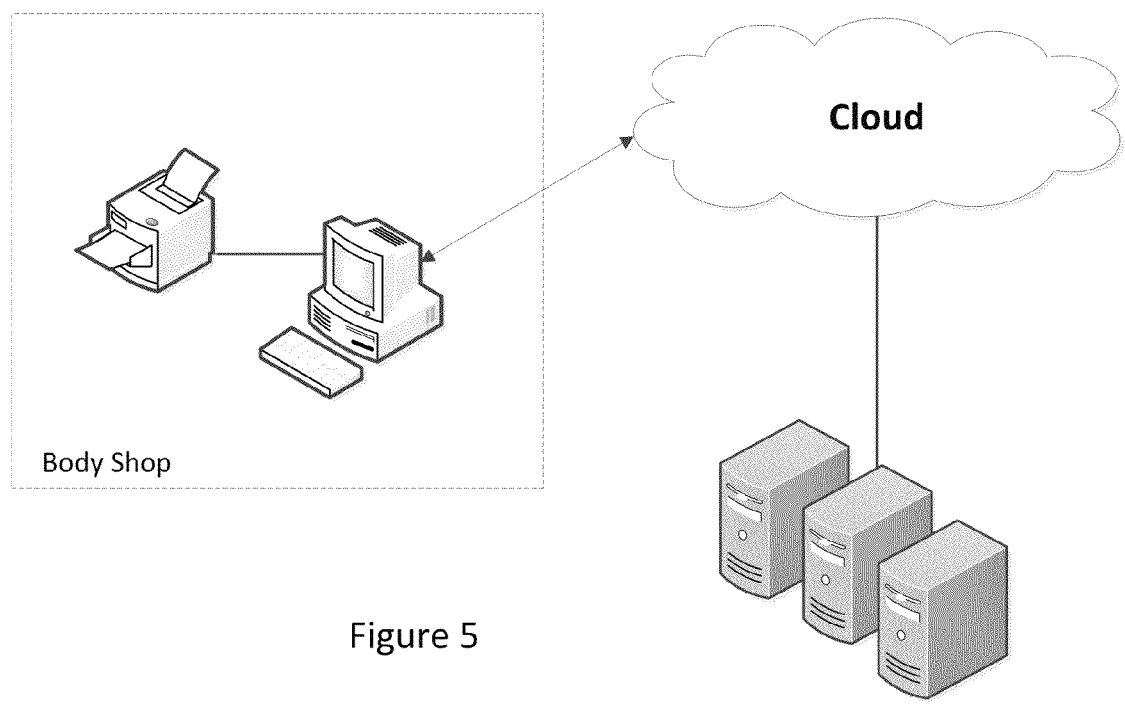
FIG. 5 of the drawings is a schematic representation of the system with which the method of the present disclosure can be executed.

To provide adhesive that has the proper perforations for a particular application, a system, shown in FIG. 5, is shown. The system comprises a computer which is coupled to a laser cutting machine, or to a cutting printer. The computer includes templates that correspond to the different emblems that are presently applied to body panels of a number of different vehicles. Such templates can be made by purchasing emblems and scanning the dimensional characteristics of the templates. As such, the emblem is purchased once to scan and save the dimensional characteristics of the item. In other embodiments, it may be possible to examine and gather data from existing emblems that are positioned on the side of a vehicle, and scan the dimensional characteristics of the different emblems. The invention is not limited to any particular manner in which the dimensional characteristics of emblems is obtained.

Once the different data is stored as to the dimensions of the different emblems, the data is available for use. For example, should the need arise for adhesive for a particular emblem, the user can determine if the emblem dimensions are stored in the computer. If they are so stored, the user can merely print the dimensional characteristics onto the adhesive sheet assembly through the cutting printer or through the laser cutter. With such equipment, a larger adhesive sheet assembly is provided and the "printer" cuts the perforations as directed by the computer. When completed, the adhesive sheet includes perforations at the requisite locations so that they match up with the configuration of the adhesive attachment surface 22 of the emblem body 12.

It is also contemplated that the system may include a three dimensional (or a two dimensional) scanner which can take an emblem that was removed from a vehicle and from the scan determine the dimensional configuration of the emblem. From that dimensional scan, the proper perforations can be calculated by the computer and transmitted to the "printer."

There are a number of different manners in which the data and the adhesive is accessible to the body shop or to the repair center (hereinafter commonly referred to as the body shop). One example comprises a full system that is sold or leased to the body shop and the body shop pays a periodic maintenance fee to gain access to the different templates. In addition, the adhesive sheets which are configured to work in the "printer" can be sold to the body shop as well.

In other embodiments, the system may operate over the internet as a web based program wherein the body shop purchases access to the templates and the body shop's "printer" is remotely directed through the web interface. In still other embodiments, the body shop may directly order the emblem adhesive in a pre-cut configuration and the same is transmitted through the mail in a ready to use configuration. In such an embodiment, the templates are stored remotely, and the cutting occurs remotely. The user controls the selection of the template, and the cutting thereof. The final template is sent through the mail to the user (or scheduled for local pickup). Of course, the library of templates can continue to grow with time and the creation of new emblems, orientations, etc.

In any one of these configurations, the body shop has a quick and cost effective manner in which to reutilize a prior emblem that is not damaged, other than there is a need for an adhesive by which to attach the emblem to the body of the automobile. For example, and with reference to FIG. 1, a vehicle may have the above emblem positioned on a tailgate or trunk panel. Where the trunk panel is damaged and requires repair, the typical approach is to remove the emblem so as to expose the surface below the emblem in preparation for painting. In the contemplated embodiment, the emblem itself is not damaged, but it is nevertheless on a damaged panel, and, in turn, it is typically removed prior to repainting of the panel. Once removed, the emblem is typically discarded. The residual adhesive that remains on the panel is then cleaned with a solvent and/or abrasive. It is also known to mask emblems or to otherwise cover the emblem, however, such preparation techniques, on many occasions renders an unsatisfactory repair.

In the present assembly and system, instead of purchasing a new emblem, the body shop obtains, through the different methods described above, a replacement adhesive. At the same time, the body shop can clean the emblem of the residual adhesive that remains, typically with the use of solvents. The replacement adhesive can be obtained in the manners described above. Once provided, the adhesive includes the proper adhesive portions that correspond to the emblem, as well as the proper spacing of the emblem, or emblem portions relative to the other emblem portions and other body components.

The body shop can then couple the cleaned emblem to the adhesive. Once prepared, the emblem can be reapplied and attached to the vehicle at the proper location. In certain embodiments, a second adhesive may be placed over the emblem (where there are multiple emblems, so as to maintain the proper relative orientation of the various components of the emblem. In other embodiments, the cut adhesive can be maintained within the larger adhesive carrier sheet, for proper orientation. Subsequently, during application, only the portions of the adhesive that will be adhered to the vehicle are exposed, with the remaining portions being covered with the coverings 35b. Once positioned on the vehicle, the unexposed portion can be removed, as it has not adhered to the vehicle. The emblem is then properly returned and adhered to the underlying vehicle. Of course, other methods of application are likewise contemplated for use, and the foregoing is merely one method of any number of methods of application.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A method of reusing an existing emblem from a vehicle comprising the steps of:
   providing an identification of an existing emblem;
   determining the dimensional characteristics of the existing emblem;
   providing an adhesive sheet;

forming a plurality of perforations through the adhesive sheet corresponding to the dimensional characteristics of the existing emblem
wherein the existing emblem further comprises a plurality of separate emblem elements that are not connected together and which are spaced apart in a predetermined orientation when positioned on a vehicle, the step of providing an adhesive sheet further comprising the step of:
maintaining the predetermined orientation of the separate elements while forming a plurality of perforations through the adhesive sheet, to, in turn, position each of the separate elements in the proper configuration on the adhesive sheet, wherein the sheet can be used to set the desired spacing between separate emblem elements, to, in turn, facilitate the application in the proper configuration on the vehicle; and—adhering the existing emblem to the vehicle in the predetermined orientation with the adhesive sheet.

2. The method of claim 1 further comprising the steps of: storing the dimensional characteristics of the existing emblem.

3. The method of claim 2 further comprising the step of supplying the adhesive sheet to a user for application onto an existing emblem.

4. The method of claim 1 wherein the adhesive sheet in the step of providing an adhesive sheet comprises a sheet having a body with an adhesive applied thereto.

5. The method of claim 3 wherein the body comprises a foam material.

6. The method of claim 1 wherein the step of forming a plurality of perforations occurs through an automated cutting plotter which is coupled to a computing device for providing the automated cutting plotter the dimensional characteristics of the existing emblem, with the perforations being separated for each of the separate emblem elements.

* * * * *